United States Patent
An et al.

(10) Patent No.: US 12,292,861 B2
(45) Date of Patent: May 6, 2025

(54) METHOD OF APPLYING COMPUTATIONAL MODEL IN MULTIPLE COMPUTATIONAL STORAGE-BASED DBMS STORAGE ENGINE

(71) Applicant: Korea Electronics Technology Institute, Seongnam-si (KR)

(72) Inventors: Jae Hoon An, Incheon (KR); Young Hwan Kim, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/387,256

(22) Filed: Nov. 6, 2023

(65) Prior Publication Data
US 2024/0160610 A1 May 16, 2024

(30) Foreign Application Priority Data
Nov. 11, 2022 (KR) .................. 10-2022-0150071

(51) Int. Cl.
*G06F 16/00* (2019.01)
*G06F 16/21* (2019.01)
*G06F 16/2455* (2019.01)

(52) U.S. Cl.
CPC .......... *G06F 16/21* (2019.01); *G06F 16/2455* (2019.01)

(58) Field of Classification Search
CPC .............. G06F 16/21; G06F 16/2455; G06F 16/24542; G06F 16/24539; G06F 16/2456
See application file for complete search history.

(56) References Cited

U.S. PATENT DOCUMENTS

| | | | |
|---|---|---|---|
| 11,874,691 B1 * | 1/2024 | Batsakis | G06F 16/2282 |
| 11,989,592 B1 * | 5/2024 | Kulkarni | H04L 63/0853 |
| 12,045,201 B1 * | 7/2024 | Satish | G06F 9/542 |
| 12,057,208 B1 * | 8/2024 | Esman | G06F 3/04842 |
| 2017/0091642 A1 * | 3/2017 | Enck | G16H 50/50 |

OTHER PUBLICATIONS

Jun, et al. "Database storage engine design based on Computational Storage Device (CSD) to improve the performance of database management systems (DBMS)" Intelligent IDC Project Office, Korea Electronics Technology Institute, 2021, (Abstract in English, 3 pages in Korean).

Korean Office Action issued on Sep. 2, 2024, in counterpart Korean Patent Application No. 10-2022-0150071 (4 pages in English, 7 pages in Korean).

* cited by examiner

*Primary Examiner* — Alexander Khong
(74) *Attorney, Agent, or Firm* — NSIP Law

(57) ABSTRACT

There is provided a query execution method in a DB system in which a plurality of CSDs are used as a storage. According to an embodiment, a query execution method includes: generating snippets for offloading a part of query computations for a query received from a client to CSDs; scheduling the generated snippets for the CSDs; collecting results of offloading; and merging the collected results of offloading. Accordingly, by dividing query computations, offloading, and processing in parallel, while processing query computations that are inappropriate for offloading by a DBMS, a query request from a client can be executed effectively and rapidly.

15 Claims, 6 Drawing Sheets

METHOD OF APPLYING COMPUTATIONAL MODEL IN MULTIPLE COMPUTATIONAL STORAGE-BASED DBMS STORAGE ENGINE

CROSS-REFERENCE TO RELATED APPLICATION(S) AND CLAIM OF PRIORITY

This application is based on and claims priority under 35 U.S.C. § 119 to Korean Patent Application No. 10-2022-0150071, filed on Nov. 11, 2022, in the Korean Intellectual Property Office, the disclosure of which is herein incorporated by reference in its entirety.

BACKGROUND

Field

The disclosure relates to query executing, and more particularly, to a method of executing a query by dividing query computations, offloading to computational storage drives (CSDs), and merging results in a database (DB) system in which a plurality of CSDs are used as a storage.

Description of Related Art

In a query executing process, a database management system (DBMS) obtains data by scanning a query from a DB, filters obtained data, and returns only filtered data to a client.

However, when there is much data to be scanned in the DB, a large amount of data may be delivered from a storage in which the DB is established to the DBMS. To this end, a bandwidth is insufficient so that an overall response speed is reduced and power consumption increases.

As a solution to this problem, a storage of a DB may be implemented by a CSD which is capable of computing, such that a part of query computations is performed in the storage. However, there is almost no discussion of a query executing method through offloading.

SUMMARY

The disclosure has been developed in order to solve the above-described problem, and an object of the disclosure is to provide a method for effectively executing a query in a DB environment in which a plurality of CSDs are used as a storage, which divides query computations, offloads and processes in parallel, while processing query computations that are inappropriate for offloading by a DBMS.

According to an embodiment of the disclosure to achieve the above-described object, a query execution method may include: generating, by a DBMS, snippets for offloading a part of query computations for a query received from a client to CSDs; scheduling, by the DBMS, the generated snippets for the CSDs; collecting, by the DBMS, results of offloading from the CSDs; and merging, by the DBMS, the collected results of offloading.

A part of the query computations may include query scanning, filtering, merging of results of filtering.

The CSDs may process the query scanning, the filtering, the merging of results of filtering in parallel by using the snippets.

Generating may include including data that is cached in a memory of the DBMS in the snippets.

Generating may include determining whether caching data should be included in scan data of the snippets by analyzing the query, and, only when it is determined that the caching data should be included in the scan data, including the caching data in the snippets.

The CSDs may perform a filtering operation after adding the caching data to the scan data when performing a query scanning operation.

The CSDs may add the caching data to a start portion of the scan data when performing the query scanning operation.

Merging may include: performing a joining operation with respect to table data that is stored in a first buffer as a result of offloading by the CSDs; performing an aggregation operation with respect to the joined table data; and storing the aggregated table data in a second buffer.

Performing the aggregation operation may be performed along with an operation of grouping the table data, and storing may include storing after arranging the table data.

According to another aspect of the disclosure, a DBMS may include: a snippet manager configured to generate snippets for offloading a part of query computations for a query received from a client to CSDs; a snippet scheduler configured to schedule the generated snippets for the CSDs; a buffer manager configured to collect results of offloading from the CSDs; and a merger manager configured to merge the collected results of offloading.

According to still another aspect of the disclosure, a query execution method may include: scheduling, by a DBMS for CSDs, snippets for offloading a part of query computations for a query received from a client to the CSDs; processing, by the CSDs, the snippets in parallel and returning table data which is results of processing to the DBMS; and merging, by the DBMS, by collecting the returned table data.

According to yet another aspect of the disclosure, a DB system may include: a DBMS configured to schedule, for CSDs, snippets for offloading a part of query computations for a query received from a client to the CSDs, and to merging by collecting table data returned by the CSDs; and CSDs configured to process the snippets received from the DBMS in parallel and to return table data which is results of processing to the DBMS.

According to embodiments of the disclosure as described above, in a DB environment in which a plurality of CSDs are used as a storage, by dividing query computations, offloading, and processing in parallel, while processing query computations that are inappropriate for offloading by a DBMS, a query request from a client can be executed effectively and rapidly.

In addition, according to embodiments of the disclosure, scan data that is cached in a DBMS and is not still stored in a CSD may be delivered to a CSD through a snippet, and may be included in scan data, so that integrity of a DB can be guaranteed.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure propose a technology for executing a query effectively and rapidly in a DB system in which a plurality of CSDs are used as a storage, which divides query computations, offloads to CSDs (push down), and processes in parallel, while processing query computations that are inappropriate for offloading by a DBMS.

Figure 1:
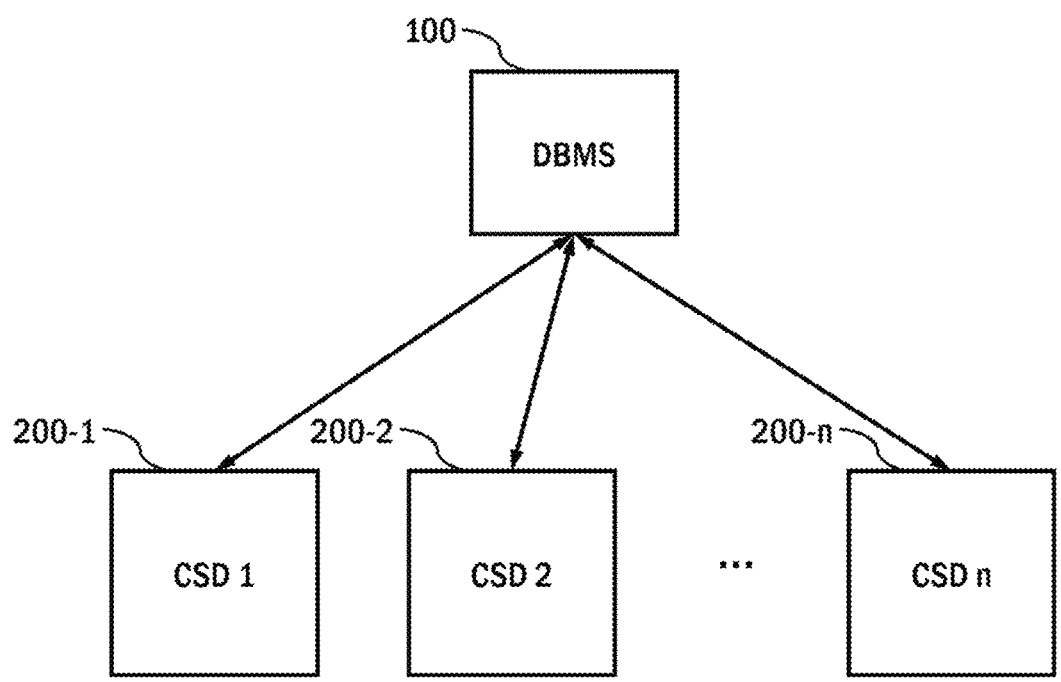
FIG. 1 is a view illustrating a DB system according to an embodiment of the disclosure.

FIG. 1 is a view illustrating a DB system according to an embodiment of the disclosure. The DB system according to an embodiment may include a DBMS 100 and a plurality of CSDs 200-1, 200-1, . . . , 200-n as shown in FIG. 1.

The CSDs 200-1, 200-2, . . . , 200-n refer to storage systems in which all or a part of DBs is overlappingly established. A plurality of CSDs 200-1, 200-1, . . . , 200-n are implemented to process many queries which are requested simultaneously. Furthermore, the CSDs 200-1, 200-2, . . . , 200-n include a computational function, and may perform a part of query computations.

The DBMS 100 refers to a system that executes a query according to a request of a client (not shown) and returns a result. The DBMS 100 may not perform all of the query computations and may offload a part of the query computations to the CSDs 200-1, 200-2, . . . , 200-n.

Figure 2:
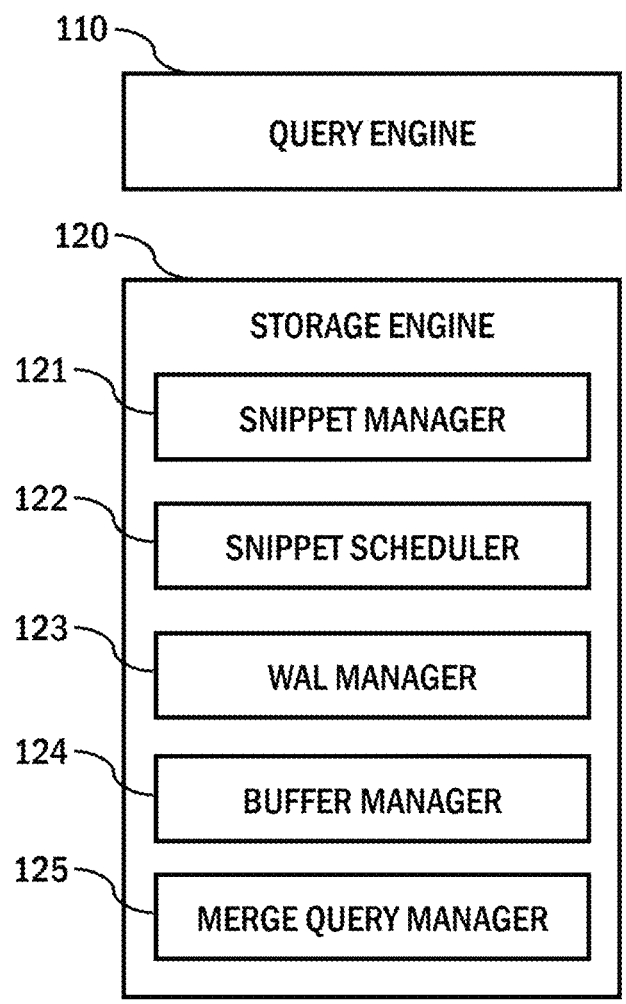
FIG. 2 is a view illustrating a structure of the DBMS shown in FIG. 1.

FIG. 2 is a view illustrating a structure of the DBMS 100 shown in FIG. 1. As shown in FIG. 2, the DBMS 100 may include a query engine 110 and a storage engine 120.

Upon receiving a query execution request from a client, the query engine 110 may optimize the received query and may deliver the query to the storage engine 120.

The storage engine 120 may offload a part of query computations to the CSDs 200-1, 200-2, . . . , 200-n. A part of the query computations may include query scanning, filtering, and merging of filtering results.

An offload snippet refers to an execution code on which a part of query computations that should be processed by a CSD, a block address of a file to be scanned, a buffer address of the DBMS to store a result of computation is recorded, and will be referred to as a "snippet" hereinbelow.

To perform the above operations, the storage engine 120 may include a snippet manager 121, a snippet scheduler 122, a write ahead log (WAL) manager 123, a buffer manager 124, and a merge query manager 125.

The snippet manager 121 may generate a group of query computation offload snippets based on a query optimized by the query engine 110, and may deliver the generated snippets to the snippet scheduler 122.

The snippet scheduler 122 may schedule the group of snippets generated by the snippet manager 12 for CSDs, respectively.

The WAL manager 123 may analyze the query delivered by the query engine 110 and may determine if data cached in a memory of the DBMS 100 should be included in scan data. If so, the WAL manager 123 may transmit caching data to the snippet manager 121, and the snippet manager 121 may include the received caching data in a snippet.

The buffer manager 124 may generate and manage a buffer for collecting results of offloading by the CSDs 200-1, 200-2, . . . , 200-n, that is, results of performing a part of the query computations by snippet processing, and a buffer for merging and storing collected results.

The merge query manager 125 may generate a final query execution result by merging results of performing a part of the query computations, which are collected by the buffer manager 124.

Hereinafter, a process of processing snippets by the CSDs 200-1, 200-2, . . . , 200-n will be described in detail with reference to FIG. 3.

Figure 3:
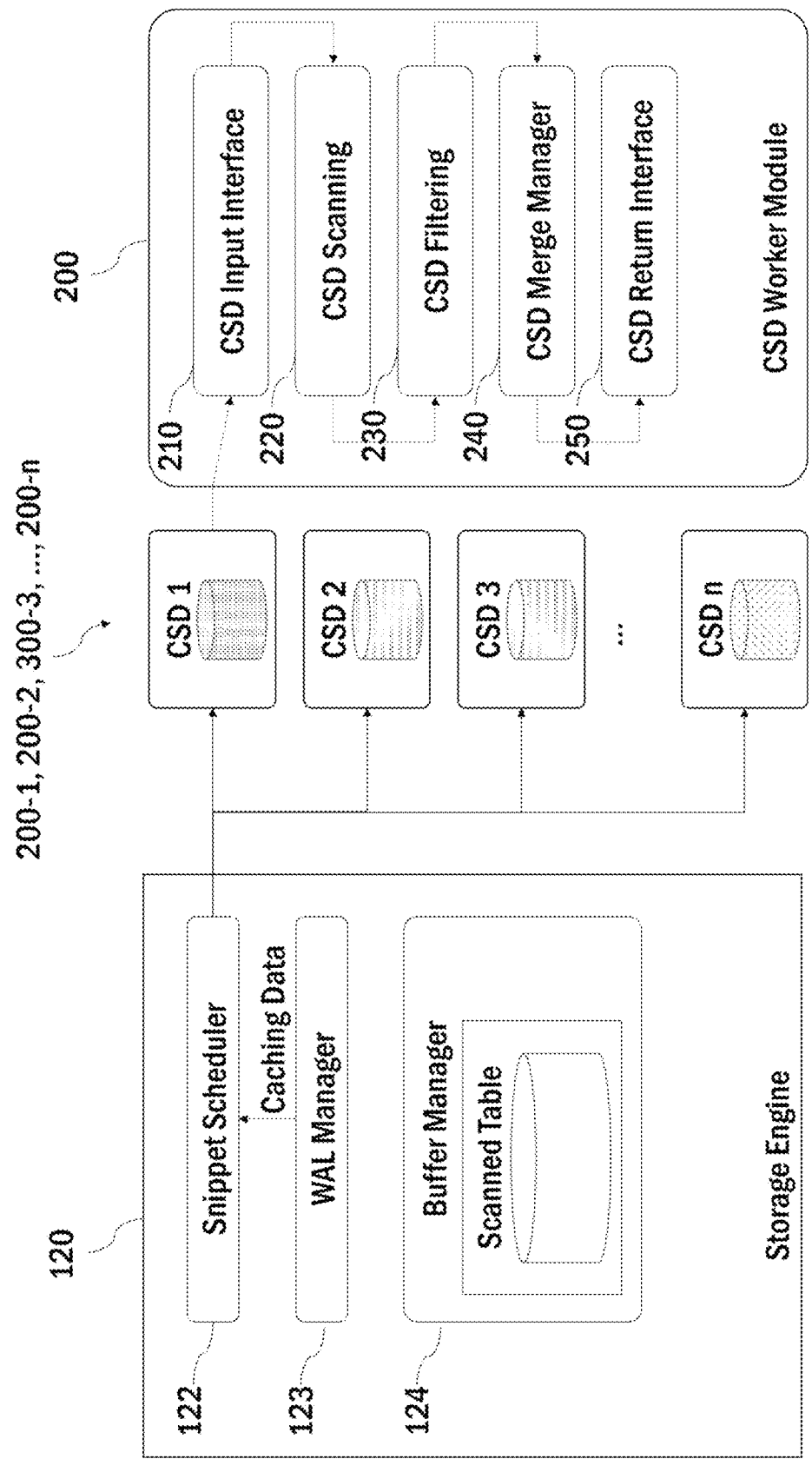
FIG. 3 is a view illustrating a snippet processing process of a CSD.

As shown in FIG. 3, the CSDs 200-1, 200-2, . . . , 200-n may receive snippets allocated thereto from the snippet scheduler 122, and caching data may be included in a snippet by the WAL manager 123.

A CSD which receives a snippet may generate a CSD worker module 200 to perform an offloading operation. The CSD worker module 200 may include a CSD input interface 210, a CSD scanning module 220, a CSD filtering module 230, a CSD merge manager 240, a CSD return interface 250.

The CSD input interface 210 may receive a snippet from the snippet scheduler 122, and may parse the snippet in such a form that the snippet is offloaded in the CSD. The parsed snippet may be inserted into a CSD scan queue.

The CSD scanning module 220 may pop a snippet from the CSD scan queue, and may scan data with reference to a block address for an offset of a scan file, which is recorded on the snippet. When caching data is included in the snippet, the CSD scanning module 220 may add the caching data to a start portion of scan data.

When a snippet contains conditional information, the CSD filtering module 230 may insert scan data into a CSD filter queue, may pop scan data from the CSD filter queue, may perform a filtering operation with respect to the scan data by using the conditional information of the snippet, and may insert filtered data into a CSD merge queue.

On the other hand, when a snippet does not contain conditional information, the CSD filtering module 230 may insert scan data into the CSD merge queue.

The CSD merge manager 240 may merge scan/filtered data which is inserted into the CSD merge queue, and may perform column projection to leave only a column necessary for executing a query, so that a size of transmission/reception data can be reduced.

When a size of merged data reaches an internal block size (default: 40K), the CSD return interface 250 may deliver a merged data block to the buffer manager 124 of the storage engine 120 and store the data block in a scan buffer.

The above-described offloading operation performed in the CSD worker module 200 may be performed in the CSDs 200-1, 200-2, 200-n in parallel.

Figure 4:
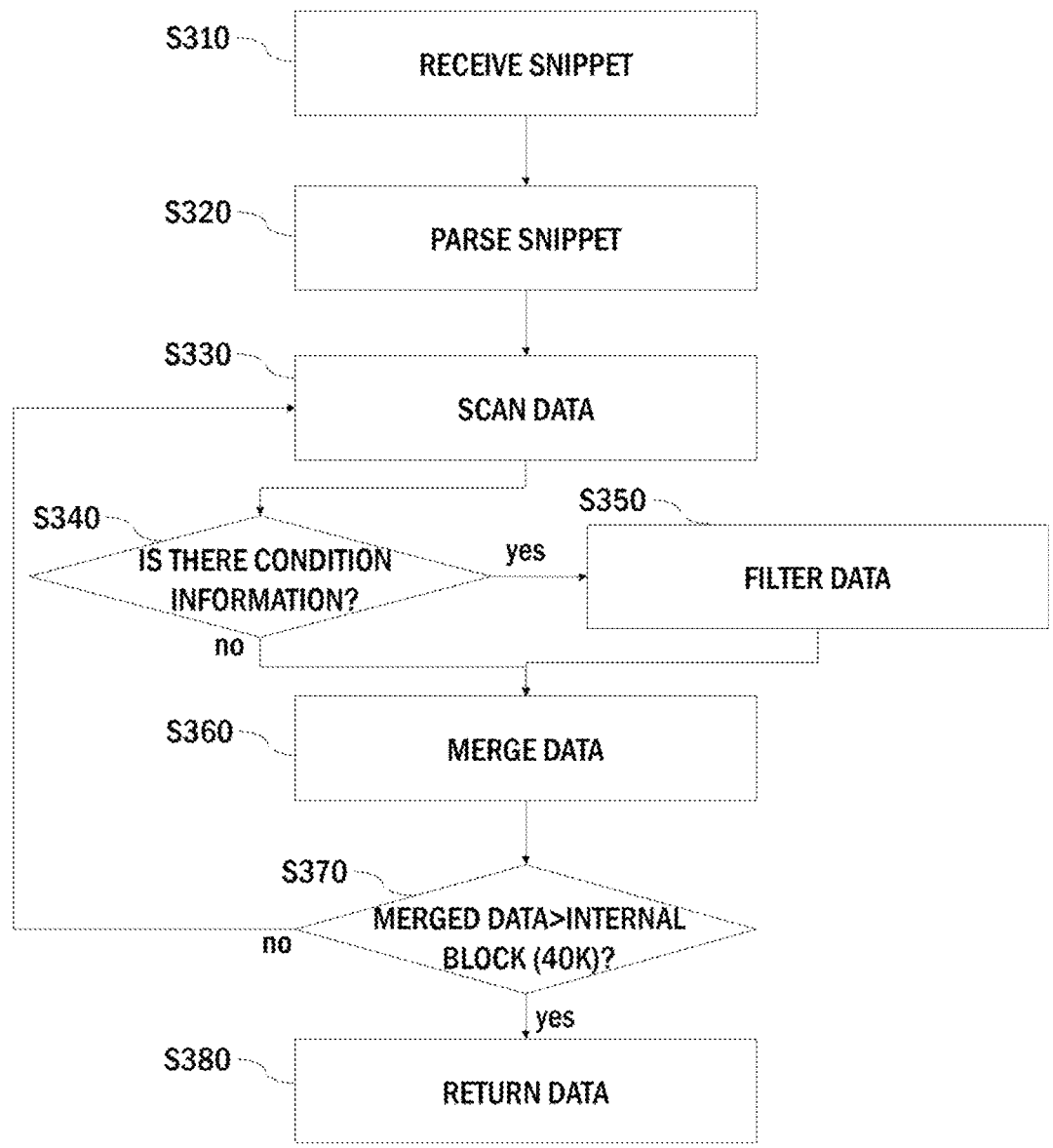
FIG. 4 is a view illustrating a snippet processing process of a CSD.

FIG. 4 is a sequence diagram illustrating an offloading process by the CSD worker module 200 of a CSD.

Steps S310 and S320 are a step of receiving a snippet and a step of parsing by the CSD input interface 210. Step S330 is a step of scanning data by the CSD scanning module 220, and steps S340 and S350 are a step of filtering data by the CSD filtering module 230. Step S360 is a step of merging data by the CSD merge manager 240, and steps S370 and S380 are a step of returning data by the CSD return interface 250.

Hereinafter, a process of merging results of offload processing by the CSDs 200-1, 200-2, . . . , 200-n by the merge query manager 125 will be described in detail with reference to FIG. 5.

Figure 5:
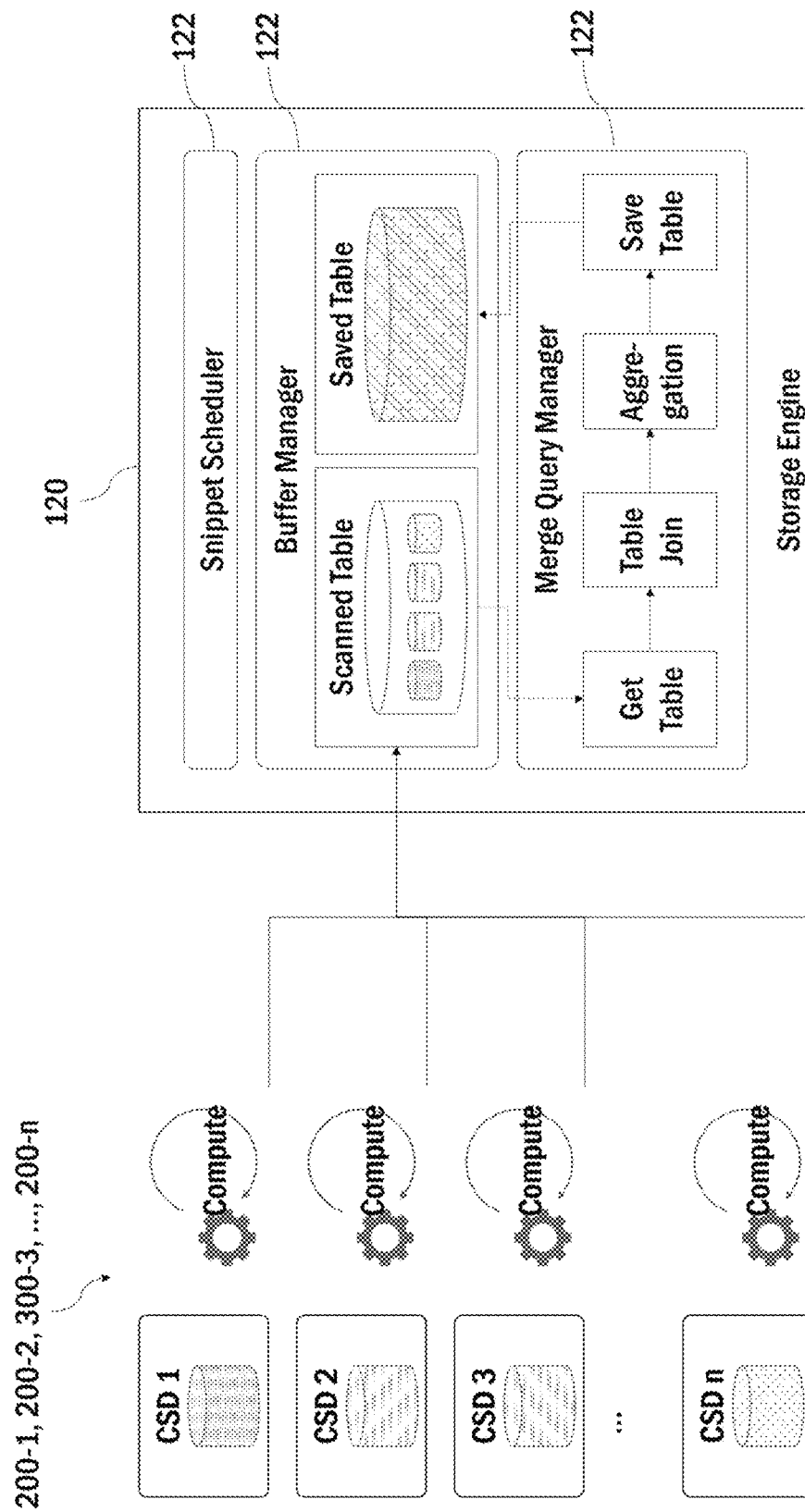
FIG. 5 is a view illustrating a merging process of a merge query manager.

As shown in FIG. 5, the merge query manager 125 may acquire necessary data from table data stored in the scan buffer of the buffer manager 124 (S410), and may perform a join operation (S420).

When the join operation between table data is completed, the merge query manager 125 may generate a storage buffer to store a result of merging in the buffer manager 124, and may perform an aggregation operation by using the joined table data (S430). In this case, when a group-by-operation should be performed, the group-by-operation may be performed along with the aggregation operation. The group-by-operation is an operation of grouping table data.

Finally, when table arrangement is needed, the merge query manager 125 may perform an order-by-operation and may store a result of performing the order-by-operation in the storage buffer 124b generated in the buffer manager 123 (S440). The order-by-operation is an operation of arranging table data in designated order.

Figure 6:
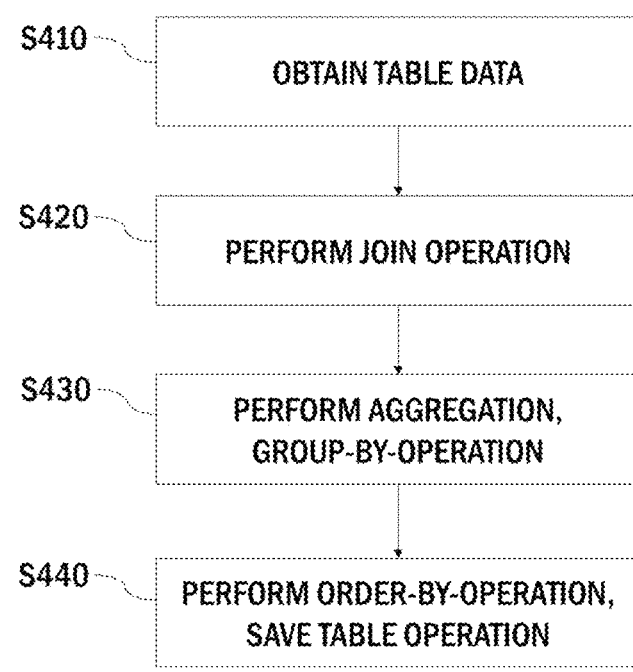
FIG. 6 is a view illustrating a merging process of a merge query manager.

FIG. 6 is a sequence diagram illustrating a process of merging results of offloading by the merge query manager 125.

Step S410 is a process of obtaining, by the merge query manager 125, table data from the scan buffer 124a of the buffer manager 124, and step S420 is a process of performing a join operation with respect to the obtained table data, step S430 is a process of performing an aggregation operation and a group-by operation, and step S440 is a process of performing an order-by-operation and storing a result of performing the order-by-operation.

Up to now, a method for executing a query request effectively and rapidly in a DB system in which a plurality of CSDs are used as a storage, which divides query computations, offloads to CSDs (push down), and processes in parallel, while processing query computations that are inappropriate for offloading by a DBMS has been described.

In addition, in the above-described embodiments, scan data that is cached in a DBMS and is not still stored in a CSD may be delivered to a CSD through a snippet, and may be included in scan data, so that integrity of a DB can be guaranteed.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A query execution method comprising:
generating, by one or more processors of a DBMS (DataBase Management System), snippets for offloading a part of query computations for a query received from a client to CSDs (Computational Storage Drives);
scheduling, by the one or more processors of the DBMS, the generated snippets for the CSDs;
collecting, by the one or more processors of the DBMS, results of the offloading from the CSDs; and
merging, by the one or more processors of the DBMS, the collected results of the offloading, wherein the merging comprises:
performing a joining operation with respect to table data that is stored in a first buffer as a result of the offloading by the CSDs;
performing an aggregation operation with respect to the joined table data;
and storing the aggregated table data in a second buffer, and wherein the generating comprises determining whether caching data should be added into scan data of the snippets based on a result of analyzing the query, and only when it is determined that the caching data should be added into the scan data, generating the snippets by including the caching data in the snippets.

2. The query execution method of claim 1, wherein a part of the query computations comprises query scanning, filtering, merging of results of filtering.

3. The query execution method of claim 2, wherein the CSDs are configured to process the query scanning, the filtering, the merging of results of filtering in parallel by using the snippets.

4. The query execution method of claim 1, wherein the generating comprises including data that is cached in a memory of the DBMS in the snippets.

5. The query execution method of claim 1, wherein the CSDs are configured to perform a filtering operation after adding the caching data to the scan data when performing a query scanning operation.

6. The query execution method of claim 5, wherein the CSDs are configured to add the caching data to a start portion of the scan data when performing the query scanning operation.

7. The query execution method of claim 1, wherein the performing the aggregation operation is performed along with an operation of grouping the table data, and
wherein the storing comprises storing after arranging the table data.

8. A processor-implemented DataBase Management System (DBMS) comprising:

one or more processors configured to:
> generate snippets for offloading a part of query computations for a query received from a client to Computational Storage Drives (CSDs);
> schedule the generated snippets for the CSDs; collect results of the offloading from the CSDs; and
> merge the collected results of the offloading, wherein, for the merging, the one or more processors are further configured to:
> > perform a joining operation with respect to table data that is stored in a first buffer as a result of the offloading by the CSDs;
> > perform an aggregation operation with respect to the joined table data; and store the aggregated table data in a second buffer,
> > and wherein, for the generating, the one or more processors are further configured to: determine whether caching data should be added into scan data of the snippets based on a result of analyzing the query; and only when it is determined that the caching data should be added into the scan data, generate the snippets by including the caching data in the snippets.

9. A processor-implemented query execution method performed by one or more processors of a DataBase Management System (DBMS), the method comprising:
> scheduling, by the DBMS for Computational Storage Drives (CSDs), snippets for offloading a part of query computations for a query received from a client to the CSDs;
> processing, by the CSDs, the snippets in parallel and returning table data which is results of processing to the DBMS; and
> merging, by the DBMS, by collecting the returned table data, wherein the merging comprises:
> > performing a joining operation with respect to table data that is stored in a first buffer as a result of the offloading by the CSDs;
> > performing an aggregation operation with respect to the joined table data; and
> > storing the aggregated table data in a second buffer, and
> wherein the scheduling comprises:
> > determining whether caching data should be added into scan data of the snippets based on a result of analyzing the query, and only when it is determined that the caching data should be added into the scan data, generating the snippets by including the caching data in the snippets.

10. The DataBase Management System (DBMS) of claim 8, wherein a part of the query computations comprises query scanning, filtering, merging of results of filtering.

11. The DataBase Management System (DBMS) of claim 10, wherein the CSDs are configured to process the query scanning, the filtering, the merging of results of filtering in parallel by using the snippets.

12. The DataBase Management System (DBMS) of claim 8, wherein the generating comprises including data that is cached in a memory of the DBMS in the snippets.

13. The DataBase Management System (DBMS) of claim 8, wherein the CSDs are configured to perform a filtering operation after adding the caching data to the scan data when performing a query scanning operation.

14. The DataBase Management System (DBMS) of claim 13, wherein the CSDs are configured to add the caching data to a start portion of the scan data when performing the query scanning operation.

15. The DataBase Management System (DBMS) of claim 8, wherein the performing the aggregation operation is performed along with an operation of grouping the table data, and
> wherein the storing comprises storing after arranging the table data.

* * * * *